(12) United States Patent
Lintereur

(10) Patent No.: US 12,478,286 B2
(45) Date of Patent: Nov. 25, 2025

(54) SYNERGISTIC FEATURES AND FUNCTIONS RELATED TO OPERATION OF A MEDICATION DELIVERY SYSTEM AND A PHYSICAL ACTIVITY DETECTION SYSTEM

(71) Applicant: MEDTRONIC MINIMED, INC., Northridge, CA (US)

(72) Inventor: Louis J. Lintereur, Boise, ID (US)

(73) Assignee: MEDTRONIC MINIMED, INC., Northridge, CA (US)

( * ) Notice: Subject to any disclaimer, the term of this patent is extended or adjusted under 35 U.S.C. 154(b) by 715 days.

(21) Appl. No.: 17/118,087

(22) Filed: Dec. 10, 2020

(65) Prior Publication Data

US 2021/0177318 A1    Jun. 17, 2021

Related U.S. Application Data

(60) Provisional application No. 62/947,922, filed on Dec. 13, 2019.

(51) Int. Cl.
| | |
|---|---|
| *A61B 5/00* | (2006.01) |
| *A61B 5/11* | (2006.01) |
| *A61B 5/145* | (2006.01) |
| *G16H 20/17* | (2018.01) |

(52) U.S. Cl.
CPC ........ *A61B 5/14532* (2013.01); *A61B 5/1118* (2013.01); *A61B 5/4836* (2013.01); *A61B 5/7246* (2013.01); *A61B 5/7285* (2013.01); *G16H 20/17* (2018.01)

(58) Field of Classification Search
CPC . A61B 5/14532; A61B 5/1118; A61B 5/4836; A61B 5/7246; A61B 5/7285; G16H 20/17
See application file for complete search history.

(56) References Cited

U.S. PATENT DOCUMENTS

| | | | |
|---|---|---|---|
| 4,562,751 A | 1/1986 | Nason et al. | |
| 4,685,903 A | 8/1987 | Cable et al. | |
| 4,755,173 A | 7/1988 | Konopka et al. | |
| 5,080,653 A | 1/1992 | Voss et al. | |
| 5,097,122 A | 3/1992 | Colman et al. | |
| 5,391,250 A | 2/1995 | Cheney, II et al. | |
| 5,485,408 A | 1/1996 | Blomquist | |

(Continued)

*Primary Examiner* — Alex M Valvis
*Assistant Examiner* — Grace L Rozanski
(74) *Attorney, Agent, or Firm* — Weaver Austin Villeneuve & Sampson LLP

(57) ABSTRACT

Systems and related operating methodologies are disclosed. An exemplary operating method obtains sensor data that indicates a physiological characteristic of the user, the sensor data provided by an analyte sensor, and determines that a current level of the physiological characteristic differs from a user-specific target level by a quantifiable amount. The method continues by searching an activity correlation database to locate one or more physical activity events correlated with the quantifiable amount of the physiological characteristic. The activity correlation database is populated with event-correlated physiological responses that associate physical activity events with corresponding changes in the physiological characteristic. A recommendation is provided for the user. The recommendation specifies the one or more physical activity events.

20 Claims, 7 Drawing Sheets

(56) References Cited

U.S. PATENT DOCUMENTS

| | | |
|---|---|---|
| 5,505,709 A | 4/1996 | Funderburk et al. |
| 5,522,803 A | 6/1996 | Teissen-Simony |
| 5,665,065 A | 9/1997 | Colman et al. |
| 5,800,420 A | 9/1998 | Gross et al. |
| 5,807,375 A | 9/1998 | Gross et al. |
| 5,925,021 A | 7/1999 | Castellano et al. |
| 5,954,643 A | 9/1999 | Van Antwerp et al. |
| 6,017,328 A | 1/2000 | Fischell et al. |
| 6,186,982 B1 | 2/2001 | Gross et al. |
| 6,246,992 B1 | 6/2001 | Brown |
| 6,248,067 B1 | 6/2001 | Causey, III et al. |
| 6,248,093 B1 | 6/2001 | Moberg |
| 6,355,021 B1 | 3/2002 | Nielsen et al. |
| 6,379,301 B1 | 4/2002 | Worthington et al. |
| 6,485,465 B2 | 11/2002 | Moberg et al. |
| 6,544,212 B2 | 4/2003 | Galley et al. |
| 6,554,798 B1 | 4/2003 | Mann et al. |
| 6,558,320 B1 | 5/2003 | Causey, III et al. |
| 6,558,351 B1 | 5/2003 | Steil et al. |
| 6,591,876 B2 | 7/2003 | Safabash |
| 6,641,533 B2 | 11/2003 | Causey, III et al. |
| 6,659,980 B2 | 12/2003 | Moberg et al. |
| 6,736,797 B1 | 5/2004 | Larsen et al. |
| 6,749,587 B2 | 6/2004 | Flaherty |
| 6,752,787 B1 | 6/2004 | Causey, III et al. |
| 6,766,183 B2 | 7/2004 | Walsh et al. |
| 6,801,420 B2 | 10/2004 | Talbot et al. |
| 6,804,544 B2 | 10/2004 | Van Antwerp et al. |
| 6,817,990 B2 | 11/2004 | Yap et al. |
| 6,932,584 B2 | 8/2005 | Gray et al. |
| 7,003,336 B2 | 2/2006 | Holker et al. |
| 7,029,444 B2 | 4/2006 | Shin et al. |
| 7,066,909 B1 | 6/2006 | Peter et al. |
| 7,137,964 B2 | 11/2006 | Flaherty |
| 7,303,549 B2 | 12/2007 | Flaherty et al. |
| 7,399,277 B2 | 7/2008 | Saidara et al. |
| 7,442,186 B2 | 10/2008 | Blomquist |
| 7,602,310 B2 | 10/2009 | Mann et al. |
| 7,621,893 B2 | 11/2009 | Moberg et al. |
| 7,647,237 B2 | 1/2010 | Malave et al. |
| 7,699,807 B2 | 4/2010 | Faust et al. |
| 7,727,148 B2 | 6/2010 | Talbot et al. |
| 7,785,313 B2 | 8/2010 | Mastrototaro |
| 7,806,886 B2 | 10/2010 | Kanderian, Jr. et al. |
| 7,819,843 B2 | 10/2010 | Mann et al. |
| 7,828,764 B2 | 11/2010 | Moberg et al. |
| 7,879,010 B2 | 2/2011 | Hunn et al. |
| 7,890,295 B2 | 2/2011 | Shin et al. |
| 7,892,206 B2 | 2/2011 | Moberg et al. |
| 7,892,748 B2 | 2/2011 | Norrild et al. |
| 7,901,394 B2 | 3/2011 | Ireland et al. |
| 7,942,844 B2 | 5/2011 | Moberg et al. |
| 7,946,985 B2 | 5/2011 | Mastrototaro et al. |
| 7,955,305 B2 | 6/2011 | Moberg et al. |
| 7,963,954 B2 | 6/2011 | Kavazov |
| 7,977,112 B2 | 7/2011 | Burke et al. |
| 7,979,259 B2 | 7/2011 | Brown |
| 7,985,330 B2 | 7/2011 | Wang et al. |
| 8,024,201 B2 | 9/2011 | Brown |
| 8,100,852 B2 | 1/2012 | Moberg et al. |
| 8,114,268 B2 | 2/2012 | Wang et al. |
| 8,114,269 B2 | 2/2012 | Cooper et al. |
| 8,137,314 B2 | 3/2012 | Mounce et al. |
| 8,181,849 B2 | 5/2012 | Bazargan et al. |
| 8,182,462 B2 | 5/2012 | Istoc et al. |
| 8,192,395 B2 | 6/2012 | Estes et al. |
| 8,195,265 B2 | 6/2012 | Goode, Jr. et al. |
| 8,202,250 B2 | 6/2012 | Stutz, Jr. |
| 8,207,859 B2 | 6/2012 | Enegren et al. |
| 8,226,615 B2 | 7/2012 | Bikovsky |
| 8,257,259 B2 | 9/2012 | Brauker et al. |
| 8,267,921 B2 | 9/2012 | Yodfat et al. |
| 8,275,437 B2 | 9/2012 | Brauker et al. |
| 8,277,415 B2 | 10/2012 | Mounce et al. |
| 8,292,849 B2 | 10/2012 | Bobroff et al. |
| 8,298,172 B2 | 10/2012 | Nielsen et al. |
| 8,303,572 B2 | 11/2012 | Adair et al. |
| 8,305,580 B2 | 11/2012 | Aasmul |
| 8,308,679 B2 | 11/2012 | Hanson et al. |
| 8,313,433 B2 | 11/2012 | Cohen et al. |
| 8,318,443 B2 | 11/2012 | Norrild et al. |
| 8,323,250 B2 | 12/2012 | Chong et al. |
| 8,343,092 B2 | 1/2013 | Rush et al. |
| 8,352,011 B2 | 1/2013 | Van Antwerp et al. |
| 8,353,829 B2 | 1/2013 | Say et al. |
| 11,185,260 B1* | 11/2021 | Ehlert ................ A61B 5/14532 |
| 2007/0123819 A1 | 5/2007 | Mernoe et al. |
| 2010/0160861 A1 | 6/2010 | Causey, III et al. |
| 2017/0188864 A1* | 7/2017 | Drury ................ A61B 5/02427 |
| 2017/0262943 A1* | 9/2017 | Akutagawa ............ G06Q 50/01 |
| 2018/0225423 A1* | 8/2018 | Bazargan ............ A61M 5/1723 |
| 2018/0366223 A1* | 12/2018 | Breton ................... G16H 50/20 |
| 2019/0053755 A1* | 2/2019 | Schabbach ........... A61B 5/4839 |
| 2019/0209777 A1* | 7/2019 | O'Connell ......... A63B 24/0062 |
| 2019/0267121 A1* | 8/2019 | de Sousa Moura ... G16H 50/20 |
| 2020/0135320 A1 | 4/2020 | Vleugels |
| 2020/0289373 A1 | 9/2020 | Vleugels |

* cited by examiner

SYNERGISTIC FEATURES AND FUNCTIONS RELATED TO OPERATION OF A MEDICATION DELIVERY SYSTEM AND A PHYSICAL ACTIVITY DETECTION SYSTEM

CROSS-REFERENCE TO RELATED APPLICATION

This application claims the benefit of U.S. provisional patent application Ser. No. 62/947,922, filed Dec. 13, 2019.

TECHNICAL FIELD

The present technology is generally related to systems that leverage the output of a physical activity detection system, such as an activity tracker, a fitness monitor, or an exercise logging application. In accordance with certain embodiments, the present technology is related to methodologies that correlate physical activity or exercise with certain features, functions, and/or operations of a medication delivery device or system.

BACKGROUND

Medical therapy delivery systems, such as fluid infusion devices, manual syringes, and smart injection pens, are relatively well known in the medical arts, for use in delivering or dispensing an agent, such as insulin or another prescribed medication, to a patient. Some diabetic patients follow a regimen that calls for multiple daily injections (MDI) via manual syringes, an insulin pen, or another type of user-activated medication delivery device. Other diabetic patients use an electronically controlled insulin infusion device, which can be manually activated and/or automatically controlled. A typical insulin infusion device includes a fluid pump mechanism and an associated drive system that actuates a plunger or piston of a fluid reservoir to deliver fluid medication from the reservoir to the body of a patient via a fluid delivery conduit between the reservoir and the body of a patient. Use of infusion pump therapy has been increasing, especially for delivering insulin to diabetic patients.

Control schemes have been developed to allow insulin infusion devices to monitor and regulate a patient's blood glucose level in a substantially continuous and autonomous manner. An insulin infusion device can be operated in an automatic mode wherein basal insulin is delivered at a rate that is automatically adjusted for the user. Moreover, an insulin infusion device can be operated to automatically calculate, recommend, and deliver insulin boluses as needed (e.g., to compensate for meals consumed by the user). Ideally, the amount of a meal bolus should be accurately calculated and administered to maintain the user's blood glucose within the desired range. In particular, an automatically generated and delivered meal bolus should safely manage the user's blood glucose level and keep it above a defined threshold level. To this end, an insulin infusion device operating in an automatic mode uses continuous glucose sensor data and control algorithms to regulate the user's blood glucose, based on a target glucose setpoint setting and user-initiated meal announcements that typically include estimations of the amount of carbohydrates to be consumed in an upcoming meal.

BRIEF SUMMARY

The subject matter of this disclosure generally relates to a system that characterizes and monitors physical activity (exercise) of users and leverages activity-related data that is correlated with certain features, functions, and/or operations of a medication delivery device or system. In the context of a system that delivers insulin to a diabetic patient, specific types of physical activity can be recommended as an alternative to a dose of insulin when the patient's glucose level is above a target level.

In one aspect, the present disclosure provides a method that involves: processing activity-identifying data to identify and characterize a plurality of physical activity events, the activity-identifying data provided by an activity detection system during physical activity of the user; obtaining sensor data that indicates a physiological characteristic of the user, the sensor data provided by an analyte sensor; processing the obtained sensor data and at least some of the activity-identifying data to correlate the plurality of physical activity events with corresponding changes in the physiological characteristic as indicated by the obtained sensor data, resulting in event-correlated physiological responses for the user; and maintaining an activity correlation database for the event-correlated physiological responses.

In another aspect, the disclosure provides a method that involves: obtaining sensor data that indicates a physiological characteristic of the user, the sensor data provided by an analyte sensor; determining that a current level of the physiological characteristic differs from a user-specific target level by a quantifiable amount; searching an activity correlation database to locate one or more physical activity events correlated with the quantifiable amount of the physiological characteristic, the activity correlation database populated with event-correlated physiological responses that associate physical activity events with corresponding changes in the physiological characteristic; and providing a recommendation for the user, the recommendation specifying the one or more physical activity events.

In yet another aspect, the disclosure provides a system having at least one non-transitory computer readable medium comprising program code instructions, and at least one processor. The program code instructions are configurable to cause the at least one processor to perform a method including the steps of: obtaining sensor data that indicates a physiological characteristic of a user, the sensor data provided by an analyte sensor; determining that a current level of the physiological characteristic differs from a user-specific target level by a quantifiable amount; searching an activity correlation database to locate one or more physical activity events correlated with the quantifiable amount of the physiological characteristic, the activity correlation database populated with event-correlated physiological responses that associate physical activity events with corresponding changes in the physiological characteristic; and providing a recommendation for the user, the recommendation specifying the one or more physical activity events.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
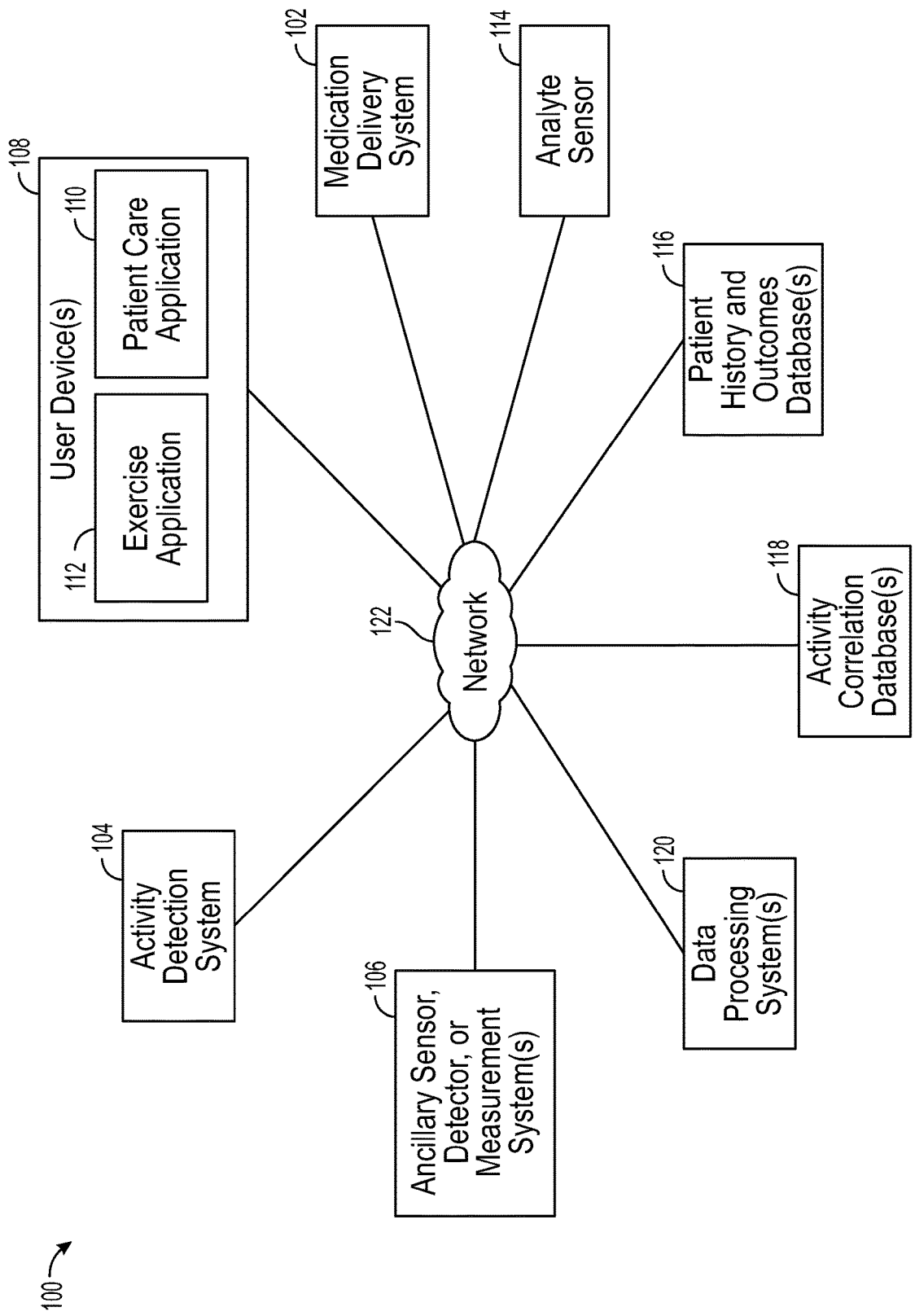
FIG. 1 is a simplified block diagram representation of an exemplary embodiment of a system that leverages data related to a user's physical activity, fitness activity, or exercise activity.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Program code instructions may be configurable to be executed by one or more processors, such as one or more digital signal processors (DSPs), general purpose microprocessors, controllers, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

FIG. 1 is a simplified block diagram representation of an exemplary embodiment of a system 100 that leverages data related to a user's physical activity, fitness activity, or exercise activity. More specifically, the system 100 correlates different types of physical activity or exercise with physiological responses or patient outcomes, such that recommendations, insights, and/or device operating instructions can be generated and communicated in an appropriate manner to achieve certain exercise-correlated results. For example, the system 100 can generate exercise-related recommendations, which may consider usage of a medication delivery system 102 to achieve a desired physiological outcome for the user. In certain embodiments, the medication delivery system 102 can be controlled in response to detected patient activity (exercise) as indicated by the output of an activity detection system 104 and/or the output of at least one ancillary sensor, detector, or measurement system 106 (hereinafter referred to as ancillary system(s) 106).

Certain embodiments of the system 100 include, without limitation: the medication delivery system 102 (or device) that regulates delivery of medication to a user; at least one activity detection system 104 that monitors user behavior and/or status to obtain activity data that indicates user activity events or behavior; at least one ancillary system 106; at least one user device 108, which may include or cooperate with a suitably written and configured patient care application 110 and/or a suitably written and configured exercise application 112; an analyte sensor 114 to measure a physiological characteristic of the user, such that sensor data obtained from the analyte sensor 114 can be used to control, regulate, or otherwise influence the operation of the medication delivery system 102; at least one patient history and outcomes database 116; and at least one activity correlation database 118. In accordance with certain cloud-implemented embodiments, the system includes at least one data processing system 120, which may be in communication with any or all of the other components of the system 100. Other configurations and topologies for the system 100 are also contemplated here, such as a system that includes additional intermediary, interface, or data repeating devices in the data path between a sending device and a receiving device.

At least some of the components of the system 100 are communicatively coupled with one another to support data communication, signaling, and/or transmission of control commands as needed, via at least one communications network 122. The at least one communications network 122 may support wireless data communication and/or data communication using tangible data communication links. FIG. 1 depicts network communication links in a simplified manner. In practice, the system 100 may cooperate with and leverage any number of wireless and any number of wired data communication networks maintained or operated by various entities and providers. Accordingly, communication between the various components of the system 100 may involve multiple network links and different data communication protocols. In this regard, the network can include or cooperate with any of the following, without limitation: a local area network; a wide area network; the Internet; a personal area network; a near-field data communication link; a cellular communication network; a satellite communication network; a video services or television broadcasting network; a network onboard a vehicle; or the like. The components of the system 100 may be suitably configured to support a variety of wireless and wired data communication protocols, technologies, and techniques as needed for compatibility with the at least one communication network 122.

The system 100 can support any type of medication delivery system 102 that is compatible with the features and functionality described here. For example, the medication delivery system 102 may be realized as a user-activated or user-actuated fluid delivery device, such as a manual syringe, an injection pen, a smart insulin pen, or the like. As another example, the medication delivery system 102 may be implemented as an electronic device that is operated to regulate the delivery of medication fluid to the user. In certain embodiments, however, the medication delivery system 102 includes or is realized as an insulin infusion device, e.g., a portable patient-worn or patient-carried insulin pump, a smart insulin pen, or the like. In such embodiments, the analyte sensor 114 includes or is realized as a glucose meter, a glucose sensor, or a continuous glucose monitor. For the sake of brevity, conventional techniques related to insulin infusion device operation, infusion set operation, and other functional aspects of the systems (and the individual operating components of the systems) may not be described in detail here. Examples of infusion pumps may be of the type described in, but not limited to, U.S. Pat. Nos. 4,562,751; 4,685,903; 5,080,653; 5,505,709; 5,097,122; 6,485,465; 6,554,798; 6,558,320; 6,558,351; 6,641,533; 6,659,980; 6,752,787; 6,817,990; 6,932,584; and 7,621,893; each of which are herein incorporated by reference.

Figure 2:
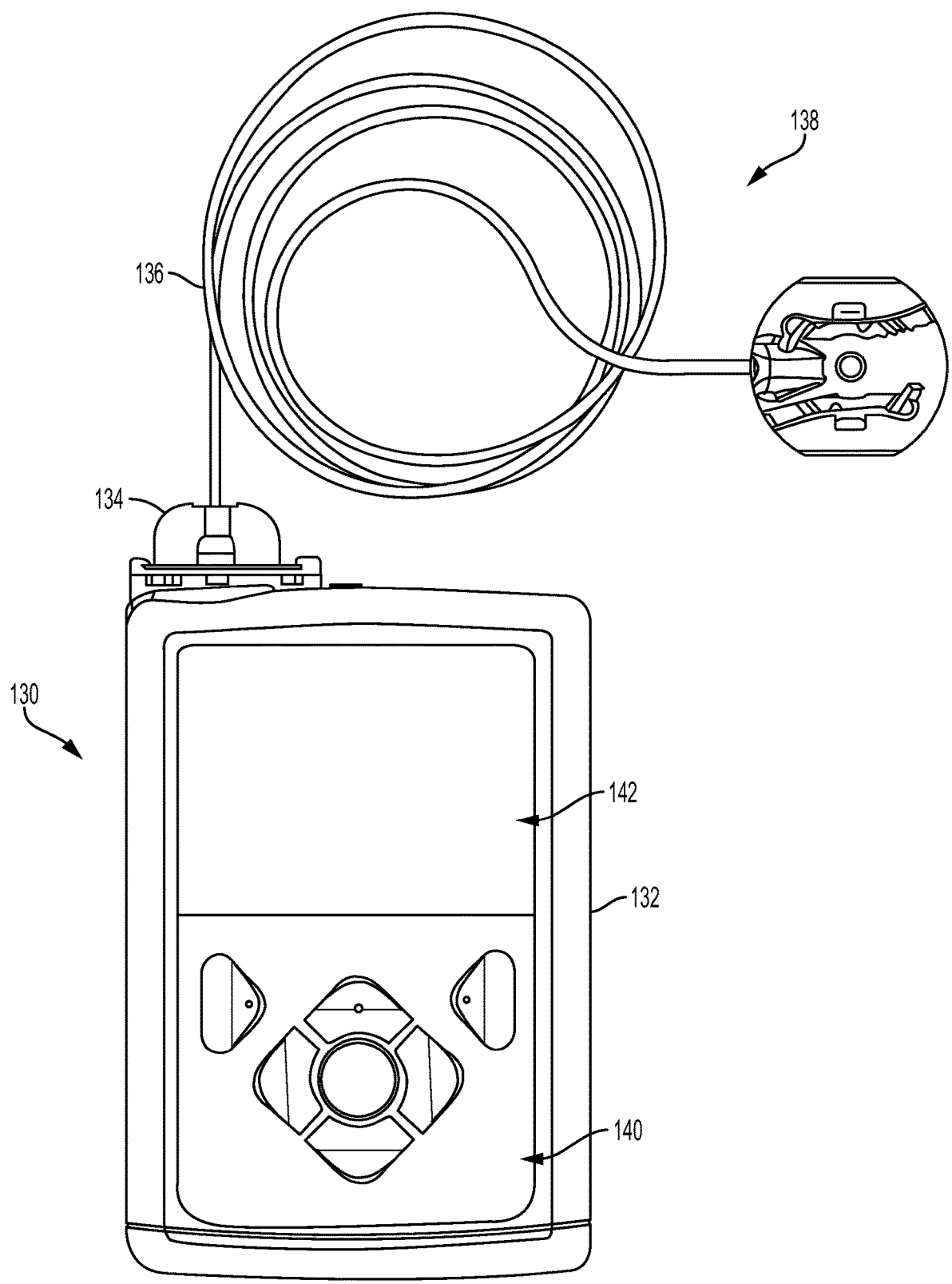
FIG. 2 is a plan view of an exemplary embodiment of an insulin infusion device that is suitable for use as the medication delivery system shown in FIG. 1.

FIG. 2 is a plan view of an exemplary embodiment of an insulin infusion device 130 suitable for use as the medication delivery system 102 shown in FIG. 1. The insulin infusion device 130 is a portable medical device designed to be carried or worn by the patient. The illustrated embodiment of the insulin infusion device 130 includes a housing 132 adapted to receive an insulin-containing reservoir (hidden from view in FIG. 2). An opening in the housing 132 accommodates a fitting 134 (or cap) for the reservoir, with the fitting 134 being configured to mate or otherwise interface with tubing 136 of an infusion set 138 that provides a fluid path to/from the body of the user. In this manner, fluid communication from the interior of the insulin reservoir to the user is established via the tubing 136. The illustrated version of the insulin infusion device 130 includes a human-machine interface (HMI) 140 (or user interface) that includes elements that can be manipulated by the user to administer a bolus of fluid (e.g., insulin), to change therapy settings, to change user preferences, to select display features, and the like. The insulin infusion device 130 also includes a display 142, such as a liquid crystal display (LCD) or another suitable display technology, that can be used to present various types of information or data to the user, such as, without limitation: the current glucose level of the patient; the time; a graph or chart of the patient's glucose level versus time; device status indicators; recommendations for therapy; insight messages; notifications; alerts; etc. The insulin infusion device 130 may be configured and controlled to support other features and interactive functions described in more detail below.

Figure 3:
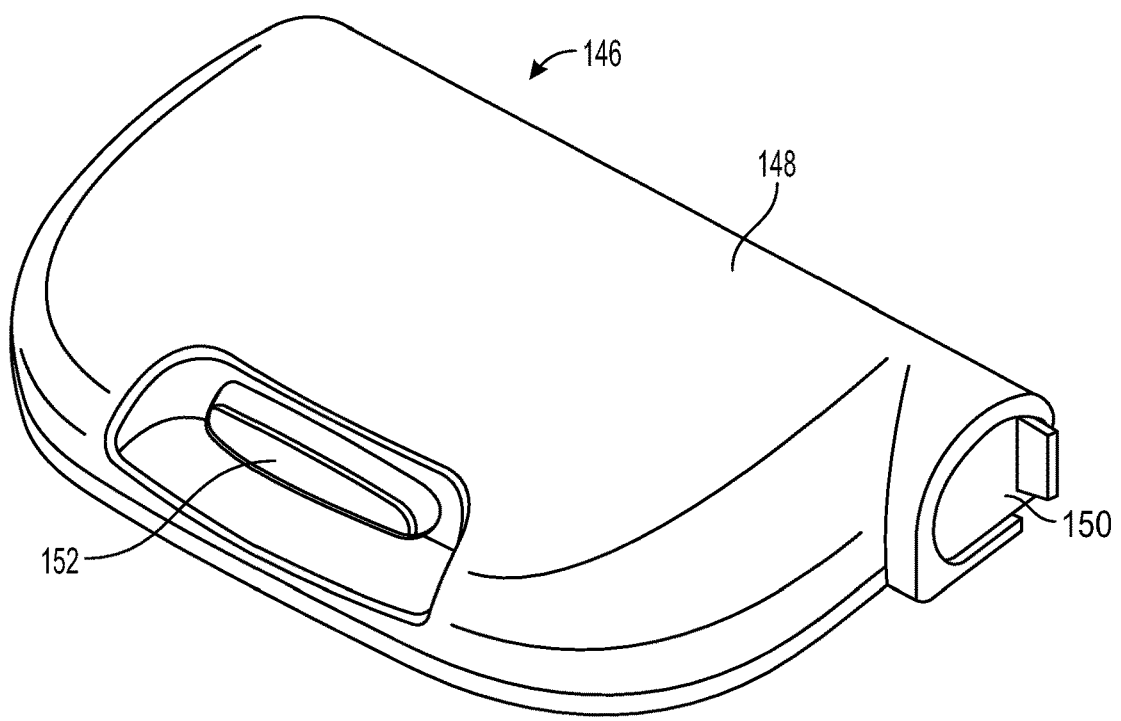
FIG. 3 is a top perspective view of an embodiment of an insulin infusion device implemented as a patch pump device that is suitable for use as the medication delivery system shown in FIG. 1.

FIG. 3 is a top perspective view of an embodiment of an insulin infusion device 146 implemented as a patch pump device that is suitable for use as the medication delivery system 102 shown in FIG. 1. The insulin infusion device 146 can be implemented as a combination device that includes an insertable insulin delivery cannula and an insertable glucose sensor (both of which are hidden from view in FIG. 3). In such an implementation, the glucose sensor may take the place of the separate analyte sensor 114 shown in FIG. 1. The insulin infusion device 146 includes a housing 148 that serves as a shell for a variety of internal components. FIG. 3 shows the insulin infusion device 146 with a removable fluid cartridge 150 installed and secured therein. The housing 148 is suitably configured to receive, secure, and release the removable fluid cartridge 150. The insulin infusion device 146 includes at least one user interface feature, which can be actuated by the patient as needed. The illustrated embodiment of the insulin infusion device 146 includes a button 152 that is physically actuated. The button 152 can be a multipurpose user interface if so desired to make it easier for the user to operate the insulin infusion device 146. In this regard, the button 152 can be used in connection with one or more of the following functions, without limitation: waking up the processor and/or electronics of the insulin infusion device 146; triggering an insertion mechanism to insert a fluid delivery cannula and/or an analyte sensor into the subcutaneous space or similar region of the user; configuring one or more settings of the insulin infusion device 146; initiating delivery of medication fluid from the fluid cartridge 150; initiating a fluid priming operation; disabling alerts or alarms generated by the insulin infusion device 146; and the like. In lieu of the button 152, the insulin infusion device 146 can employ a slider mechanism, a pin, a lever, a switch, a touch-sensitive element, or the like. In certain embodiments, the insulin infusion device 146 may be configured and controlled to support other features and interactive functions described in more detail below.

Generally, a fluid infusion device (such as the insulin infusion device 130 or the insulin infusion device 146) includes a fluid pump mechanism having a motor or other actuation arrangement that is operable to linearly displace a plunger (or stopper) of a fluid reservoir provided within the fluid infusion device to deliver a dosage of fluid medication, such as insulin, to the body of a user. Dosage commands that govern operation of the motor may be generated in an automated manner in accordance with the delivery control scheme associated with a particular operating mode, and the dosage commands may be generated in a manner that is influenced by a current (or most recent) measurement of a physiological condition in the body of the user. For a glucose control system suitable for use by diabetic patients, a closed-loop or automatic operating mode can be used to generate insulin dosage commands based on a difference between a current (or most recent) measurement of the interstitial fluid glucose level in the body of the user and a target (or reference) glucose setpoint value. In this regard, the rate of infusion may vary as the difference between a current measurement value and the target measurement value fluctuates. For purposes of explanation, the subject matter is described herein in the context of the infused fluid being insulin for regulating a glucose level of a user (or patient); however, it should be appreciated that many other fluids may be administered through infusion, and the subject matter described herein is not necessarily limited to use with insulin.

Figure 4:
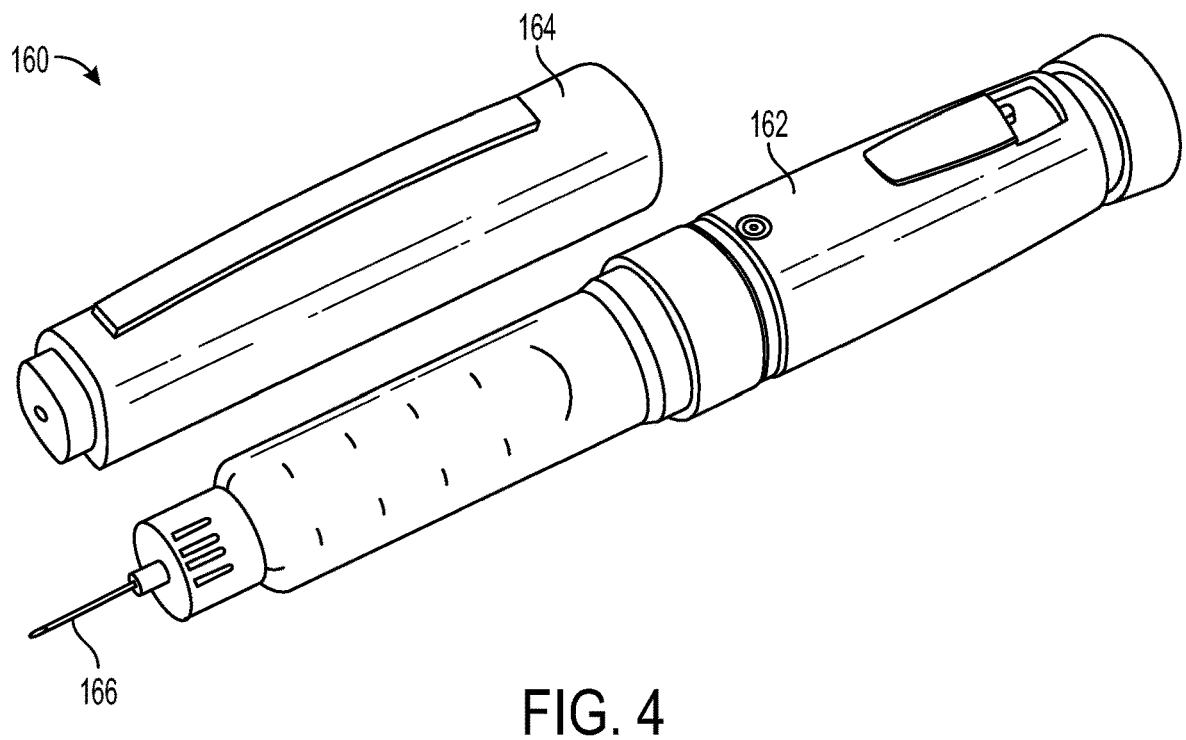
FIG. 4 is a perspective view of an exemplary embodiment of a smart insulin pen that is suitable for use as the medication delivery system shown in FIG. 1.

FIG. 4 is a perspective view of an exemplary embodiment of a smart insulin pen 160 suitable for use as the medication delivery system shown in FIG. 1. The pen 160 includes an injector body 162 and a cap 164. FIG. 4 shows the cap 164 removed from the injector body 162, such that a delivery needle 166 is exposed. The pen 160 includes suitably configured electronics and processing capability to communicate with an application running on a user device, such as a smartphone, to support various functions and features such as: tracking active insulin; calculating insulin dosages (boluses); tracking insulin dosages; monitoring insulin supply levels; patient reminders and notifications; and patient status reporting. Referring to FIG. 1, an implementation and deployment of the pen 160 wirelessly communicates with the patient care application 110 of the user device 108. In certain embodiments, the smart insulin pen 160 can receive insulin dosage recommendations or instructions and/or recommended dosing times (or a recommended dosing schedule). For example, the pen 160 may be suitably configured to receive recommendations and/or instructions from the patient care application 110, the data processing system(s) 120, or another component of the system 100. Moreover, the smart insulin pen 160 may be configured and controlled to support other features and interactive functions described in more detail below.

Figure 5:
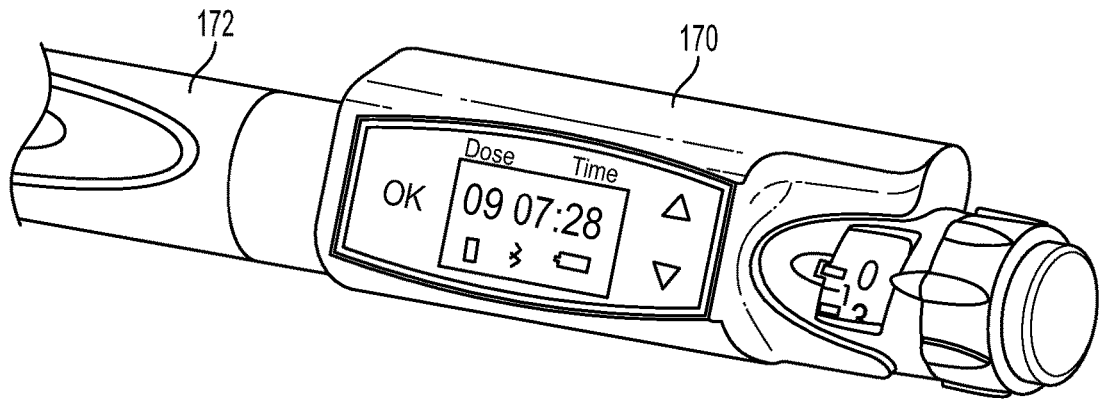
FIG. 5 is a perspective view of an exemplary embodiment of a smart pen accessory that is suitable for use with the medication delivery system shown in FIG. 1.

FIG. 5 is a perspective view of an exemplary embodiment of a smart pen accessory 170 that is suitable for use with the medication delivery system 102 shown in FIG. 1. In particular, the smart pen accessory 170 cooperates with a "non-smart" insulin pen that lacks the intelligence and functionality of a smart insulin pen (as described above). The smart pen accessory 170 can be realized as a pen cap, a clip-on apparatus, a sleeve, or the like. The smart pen accessory 170 is attached to an insulin pen 172 such that the smart pen accessory 170 can measure the amount of insulin delivered by the insulin pen 172. The insulin dosage data is stored by the smart pen accessory 170 along with corresponding date/time stamp information. In certain embodiments, the smart pen accessory 170 can receive, store, and process additional patient-related or therapy-related data, such as glucose data. Indeed, the smart pen accessory 170 may also support various features and functions described above in the context of the smart insulin pen 160. For example, the smart pen accessory 170 may be configured to receive insulin dosage recommendations or instructions and/or recommended dosing times (or a recommended dosing schedule). Moreover, the smart pen accessory 170 may be configured and controlled to support other features and interactive functions described in more detail below.

Referring again to FIG. 1, the analyte sensor 114 may communicate sensor data to the medication delivery system 102 for use in regulating or controlling operation of the medication delivery system 102. Alternatively or additionally, the analyte sensor 114 may communicate sensor data to one or more other components in the system 100, such as, without limitation: a user device 108 (for use with the patient care application 110); a data processing system 120; a patient history and outcomes database 116; and/or an activity correlation database 118.

The system 100 can support any number of user devices 108 linked to or used by the particular user or patient. In this regard, a user device 108 may be, without limitation: a smartphone device; a laptop, desktop, or tablet computer device; a medical device; a wearable device; a global positioning system (GPS) receiver device; a system, component, or feature onboard a vehicle; a smartwatch device; a television system; a household appliance; a video game device; a media player device; or the like. For the example described here, the medication delivery system 102 and the at least one user device 108 are owned by, operated by, or otherwise linked to a user/patient. Any given user device 108 can host, run, or otherwise execute the patient care application 110. Similarly, any given user device 108 can host, run, or otherwise execute the exercise application 112. For simplicity and ease of illustration, FIG. 1 depicts one user device 108 running the patient care application 110 and the exercise application 112. In certain embodiments, for example, the user device 108 is implemented as a smartphone with the patient care application 110 and the exercise application 112 installed thereon. In accordance with another example, the patient care application 110 is implemented in the form of a website or webpage, e.g., a website of a healthcare provider, a website of the manufacturer, supplier, or retailer of the medication delivery system 102, or a website of the manufacturer, supplier, or retailer of the analyte sensor 114. In accordance with another example, the medication delivery system 102 executes the patient care application 110 as a native function.

In certain embodiments, at least some of the features or output of the activity detection system 104, the ancillary system(s) 106, and/or the exercise application 112 can be used to influence features, functions, and/or therapy-related operations of the medication delivery system 102. In particular, the system 104, the system 106, and/or the exercise application 112 may be suitably configured and operated to generate and provide output (e.g., data, control signals, markers, or flags) that characterizes, describes, classifies, or categorizes an exercise event, such that the medication delivery system 102 can dynamically respond in an appropriate manner that contemplates physiological changes of the user that may result from the indicated exercise activity. Alternatively or additionally, output of the system 104, the system 106, and/or the exercise application 112 may be utilized to generate and communicate recommendations, guidance, suggestions, or insights to the user, wherein the communicated information relates to how the user's physiological response might be influenced by certain types of exercise activity.

The activity detection system 104 includes one or more sensors, detectors, measurement devices, and/or readers to automatically obtain measurements that correlate to user activity, fitness behavior, physical exercise, or the like (e.g., body movements, walking, running, swimming, biking, climbing, working out, lifting weights, rowing). In certain embodiments, the activity detection system 104 is configured to output activity data providing at least one activity metric associated with the user's movement during an activity or exercise. Exemplary metrics include, without limitation: distance moved; speed or velocity; acceleration; heart rate; step count; cadence; elevation change; location or geographic position; activity time; elevation change rate; power; and energy output (calorie count). The activity detection system 104 may communicate activity data to the medication delivery system 102 or the user device 108 for processing in an appropriate manner for use in regulating or controlling certain functions of the medication delivery system 102 or for purposes of generating recommendations or notifications for the user. For example, the activity data may be communicated to a user device 108, such that an application running at the user device 108 (e.g., the exercise application 112) can process the activity data and inform the user or the medication delivery system 102 as needed. As another example, the activity detection system 104 may communicate the activity data to one or more cloud computing systems or servers (such as a remote data processing system 120) for appropriate processing and handling in the manner described herein.

An implementation of the activity detection system 104 may include activity sensors, a display, data storage, at least one processor and a wireless communication interface to establish communication links with one or more other components of the system 100. Activity and exercise related metrics can be processed and rendered on the display for viewing by the user. Moreover, an activity log can be kept in the data storage resident at the activity detection system 104 for logging, with respect to time, activity data of the user.

Activity sensors utilized by the activity detection system 104 may include, without limitation, any combination of: a GPS (Global Positioning System) receiver; at least one motion sensor such as accelerometers and gyroscopes; an altimeter; and a heart rate monitor. Additional or alternative activity sensors can be included, as appropriate for the particular embodiment and application. GPS data can be processed to monitor movement of a user during an activity, and to accurately track and measure the distance moved during running, walking, cycling, swimming, etc. Moreover, speed and time data for the activity can be derived from GPS data. An altimeter that measures atmospheric pressure can be used to determine elevation above sea level (or some other reference plane). In certain embodiments, elevation data can be derived from GPS data, or it can be derived from a combination of GPS data and altimeter measurements. Motion sensors such as multi-axis accelerometers and gyroscopes allow the activity detection system 104 to differentiate types of activities and also to count steps during walking and running (cadence data), among other functions. Further, lap counts during swimming can be detected from motion sensor data that indicates when the swimmer performs a lap turn. The activity detection system 104 may employ an optical heart rate sensor configured to direct light against the skin and to detect changes of reflectivity with heart beats. Electrocardiogram (ECG) type heart rate sensors are another possibility for measuring heart rate.

Similarly, an ancillary system 106 that monitors a user may include one or more sensors, detectors, measurement devices, and/or readers that obtain ancillary user status data that correlates to user activity, fitness metrics, detectable exercise behavior, etc. In certain embodiments, an ancillary system 106 may include, cooperate with, or be realized as any of the following, without limitation: a heartrate monitor linked to the user; a blood pressure monitor linked to the user; a respiratory rate monitor linked to the user; a vital signs monitor linked to the user; a microphone; a thermometer (for the user's body temperature and/or the environmental temperature); a sweat detector linked to the user; a global positioning system (GPS); a clock, calendar, or appointment application linked to the user; a pedometer linked to the user; a gesture-based physical behavior detection system, or the like. An ancillary system 106 may be configured and operated to communicate its output (user status data) to one or more components of the system 100 for analysis, processing, and handling in the manner described herein. In certain embodiments, user status data obtained from one or more ancillary systems 106 supplements the activity data obtained from the activity detection system 104, such that exercise events can be accurately and reliably detected and characterized.

In some embodiments, the activity detection system 104 and/or an ancillary system 106 may include, cooperate with, or be implemented as a gesture-based physical behavior detection system (which may be a motion-based detection system, an activity-based detection system, an image or video based detection system, or the like). In certain embodiments, a gesture-based physical behavior detection system can be realized as a unitary "self-contained" wearable or carried system, such as a fitness monitor device, a smart watch device, a smart bracelet or wristband device, or the like. In some embodiments, a gesture-based physical behavior system can be implemented with a wearable or portable smart device that is linked with one or more external sensors worn or carried by the user. In this regard, United States patent publication number US 2020/0135320 and United States patent publication number US 2020/0289373 disclose gesture-based physical behavior detection systems that are suitable for use with the system 100; the entire content of these United States patent documents is incorporated by reference herein.

The "raw" activity sensor data collected or generated by the activity detection system 104, along with any "raw" user status data collected or generated by the ancillary system(s) 106, can be processed and analyzed to characterize, define, classify, and/or categorize the corresponding activity or exercise (hereinafter referred to as "exercise characterization"). In certain embodiments, the activity detection system 104 includes native processing capability to perform at least some of the exercise characterization. Alternatively or additionally, the exercise application 112 of a user device 108 receives activity sensor data (and any applicable user status data) and performs some or all of the exercise characterization. Alternatively or additionally, a remote data processing system 120 receives activity sensor data (and any applicable user status data) and performs some or all of the exercise characterization. The resulting characterized data, which correlates certain types of detectable activities with particular exercises and activities, can be stored and maintained in at least one suitable location, such as an activity correlation database 118, a user device 108, the medication delivery system 102, or the like.

In certain embodiments, the activity detection system 104 and the medication delivery system 102 are implemented as physically distinct and separate components, as depicted in FIG. 1. In such embodiments, the activity detection system 104 is external to the medication delivery system 102 and is realized as an ancillary component, relative to the medication delivery system 102. In accordance with alternative embodiments, however, the medication delivery system 102 and the activity detection system 104 can be combined into a single hardware component or provided as a set of attached hardware devices. For example, the medication delivery system 102 may include the activity detection system 104 or integrate the functionality of the system 104. Similarly, the analyte sensor 114 can be incorporated with the medication delivery system 102 or the activity detection system 104. These and other arrangements, deployments, and topologies of the system 100 are contemplated by this disclosure.

The at least one patient history and outcomes database 116 includes historical data related to the user's physical condition, physiological response to the medication regulated by the medication delivery system 102, activity patterns or related information, eating patterns and habits, work habits, and the like. In accordance with embodiments where the medication delivery system 102 is an insulin infusion device and the analyte sensor 114 is a glucose meter, sensor, or monitor, the database 116 can maintain any of the following, without limitation: historical glucose data and corresponding date/time stamp information; insulin delivery and dosage information; user-declared exercise markers or indicators; activity data (provided by the activity detection system 104) and corresponding date/time stamp information; ancillary user status data (provided by one or more ancillary systems 106) and corresponding date/time stamp data; diet or food intake history for the user; and any other information that may be generated by or used by the system 100 for purposes of controlling, supervising, or advising the operation of the medication delivery system 102. In certain embodiments, the at least one patient history and outcomes database 116 can receive and maintain training data that is utilized to train, configure, and initialize the system 100 based on historical user behavior, physiological state, operation of the medication delivery system 102, and user-identified exercise events.

A patient history and outcomes database 116 may reside at a user device 108, at the medication delivery system 102, at a data processing system 120, or at any network-accessible location (e.g., a cloud-based database or server system). In certain embodiments, a patient history and outcomes database 116 may be included with the patient care application 110 and/or with the exercise application 112. The patient history and outcomes database 116 enables the system 100 to generate recommendations, warnings, and guidance for the user and/or to regulate the manner in which the medication delivery system 102 functions to administer therapy to the user, based on detected and characterized exercise events.

The at least one activity correlation database 118 includes database objects (entries) that correlate detectable and characterized activity/exercise events with historical data related to the user's physiological response to those events. In accordance with embodiments where the medication delivery system 102 is an insulin infusion device and the physiological characteristic of interest is the user's glucose level, the activity correlation database 118 can maintain entries that associate changes in glucose level (typically measured in units of mg/dL) with specific activity/exercise events. For example, the activity correlation database 118 may include basic or simple entries akin to any of the following:

X minute bike ride: −30 mg/dL
Y minute walk: −25 mg/dL
Routine morning dog walk: −15 mg/dL In certain embodiments, however, the activity correlation database 118 may include more detailed or specific entries, which may contemplate parameters such as intensity, duration, average pace/speed, heart rate, season, terrain, equipment (including settings), and the like. For example, the activity correlation database 118 may include the following information:

Outdoor X minute run, Y miles (or at Z minutes-per-mile pace), during summer months, average heartrate of Z beats/minute: −20 mg/dL X minute run on a treadmill at I incline, Y miles (or at Z minutes-per-mile pace), during summer months, average heartrate of Z beats/minute: −20 mg/dL Biking the Rainbow Gulch loop, mid-morning start time, average speed of X miles/hour, average body temperature of Y degrees: −15 mg/dL Playing tennis, X games completed, during spring months, afternoon start time, average heartrate of Y beats/minute, average respiratory rate of Z breath/minute: −30 mg/dL X minute weightlifting session, using bodyweight, average heartrate of Z beats/minute: −12 mg/dL X high intensity interval training session, indoors, average heartrate of Z beats/minute: −23 mg/dL It should be appreciated that the activity correlation database 118 may include any number of entries for a given user. Ideally, the activity correlation database 118 will be populated with sufficient user-specific entries to contemplate detectable and characterized activities and exercises for each supported user. In other words, the system 100 can be trained in an appropriate manner to provide personalized support for each user/patient.

Alternatively or additionally, the activity correlation database 118 may include any number of entries that are derived from data collected for a population of users, which need not include the particular user of the medication delivery system 102. In this regard, the database 118 may contain activity-correlated information that fits a particular category, classification, or group of people. For example, population-based activity data (with or without related user status data from ancillary systems 106) can be collected, analyzed, and characterized for a group of users, such as, without limitation: diabetic males under the age of 21 with a normal body mass index (BMI); diabetic females between the age of 21 and 30 with an overweight BMI and high blood pressure; physically active females over the age of 50 with a normal BMI and low blood pressure. Accordingly, the system 100 can support users in the absence of user-specific historical data and/or if users are reluctant to provide their own activity/fitness data for analysis.

An activity correlation database 118 may reside at a user device 108, at the medication delivery system 102, at a data processing system 120, or at any network-accessible location (e.g., a cloud-based database or server system). In certain embodiments, an activity correlation database 118 may be included with the patient care application 110 and/or with the exercise application 112. The activity correlation database 118 enables the system 100 to generate recommendations, warnings, and guidance for the user and/or to regulate the manner in which the medication delivery system 102 functions to administer therapy to the user, based on detected and characterized activity events and the manner in which those detected events impact the user's physiological state.

Figure 6:
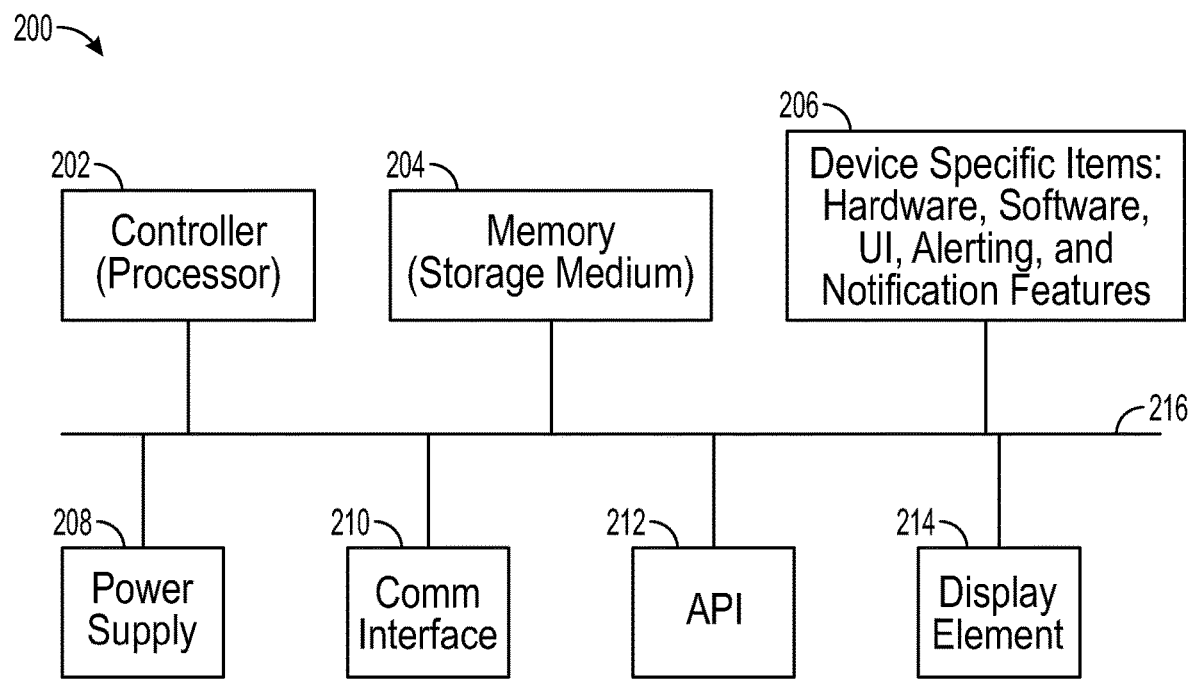
FIG. 6 is a block diagram representation of an exemplary embodiment of a computer-based or processor-based device suitable for deployment in the system shown in FIG. 1.

In accordance with certain embodiments, any or all of the components shown in FIG. 1 can be implemented as a computer-based or a processor-based device, system, or component having suitably configured hardware and software written to perform the functions and methods needed to support the features described herein. In this regard, FIG. 6 is a simplified block diagram representation of an exemplary embodiment of a computer-based or processor-based device 200 that is suitable for deployment in the system 100 shown in FIG. 1.

The illustrated embodiment of the device 200 is intended to be a high-level and generic representation of one suitable platform. In this regard, any computer-based or processor-based component of the system 100 can utilize the architecture of the device 200. The illustrated embodiment of the device 200 generally includes, without limitation: at least one controller (or processor) 202; a suitable amount of memory 204 that is associated with the at least one controller 202; device-specific items 206 (including, without limitation: hardware, software, firmware, user interface (UI), alerting, and notification features); a power supply 208 such as a disposable or rechargeable battery; a communication interface 210; at least one application programming interface (API) 212; and a display element 214. Of course, an implementation of the device 200 may include additional elements, components, modules, and functionality configured to support various features that are unrelated to the primary subject matter described here. For example, the device 200 may include certain features and elements to support conventional functions that might be related to the particular implementation and deployment of the device 200. In practice, the elements of the device 200 may be coupled together via at least one bus or any suitable interconnection architecture 216.

The at least one controller 202 may be implemented or performed with a general purpose processor, a content addressable memory, a microcontroller unit, a digital signal processor, an application specific integrated circuit, a field programmable gate array, any suitable programmable logic device, discrete gate or transistor logic, discrete hardware components, or any combination designed to perform the functions described here. Moreover, the at least one controller 202 may be implemented as a combination of computing devices, e.g., a combination of a digital signal processor and a microprocessor, a plurality of microprocessors, one or more microprocessors in conjunction with a digital signal processor core, or any other such configuration.

The memory 204 may be realized as at least one memory element, device, module, or unit, such as: RAM memory, flash memory, EPROM memory, EEPROM memory, registers, a hard disk, a removable disk, a CD-ROM, or any other form of storage medium known in the art. In this regard, the memory 204 can be coupled to the at least one controller 202 such that the at least one controller 202 can read information from, and write information to, the memory 204. In the alternative, the memory 204 may be integral to the at least one controller 202. As an example, the at least one controller 202 and the memory 204 may reside in an ASIC. At least a portion of the memory 204 can be realized as a computer storage medium that is operatively associated with the at least one controller 202, e.g., a tangible, non-transitory computer-readable medium having computer-executable instructions stored thereon. The computer-executable instructions are configurable to be executed by the at least one controller 202 to cause the at least one controller 202 to perform certain tasks, operations, functions, and processes that are specific to the particular embodiment. In this regard, the memory 204 may represent one suitable implementation of such computer-readable media. Alternatively or additionally, the device 200 could receive and cooperate with computer-readable media (not separately shown) that is realized as a portable or mobile component or platform, e.g., a portable hard drive, a USB flash drive, an optical disc, or the like.

The device-specific items 206 may vary from one embodiment of the device 200 to another. For example, the device-specific items 206 will support: sensor device operations when the device 200 is realized as a sensor device; smartphone features and functionality when the device 200 is realized as a smartphone; activity tracker features and functionality when the device 200 is realized as an activity tracker; smart watch features and functionality when the device 200 is realized as a smart watch; medical device features and functionality when the device is realized as a medical device; etc. In practice, certain portions or aspects of the device-specific items 206 may be implemented in one or more of the other blocks depicted in FIG. 6.

If present, the UI of the device 200 may include or cooperate with various features to allow a user to interact with the device 200. Accordingly, the UI may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the device 200. The UI may include one or more graphical user interface (GUI) control elements that enable a user to manipulate or otherwise interact with an application via the display element 214. The display element 214 and/or the device-specific items 206 may be utilized to generate, present, render, output, and/or annunciate alerts, alarms, messages, or notifications that are associated with operation of the medication delivery system 102, associated with a status or condition of the user, associated with operation, status, or condition of the system 100, etc.

The communication interface 210 facilitates data communication between the device 200 and other components as needed during the operation of the device 200. In the context of this description, the communication interface 210 can be employed to transmit or stream device-related control data, patient-related user status (e.g., gesture data or status data), device-related status or operational data, sensor data, calibration data, and the like. It should be appreciated that the particular configuration and functionality of the communication interface 210 can vary depending on the hardware platform and specific implementation of the device 200. In practice, an embodiment of the device 200 may support wireless data communication and/or wired data communication, using various data communication protocols. For example, the communication interface 210 could support one or more wireless data communication protocols, techniques, or methodologies, including, without limitation: RF; IrDA (infrared); Bluetooth; BLE; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication interface 210 could support one or more wired/cabled data communication protocols, including, without limitation: Ethernet; powerline; home network communication protocols; USB; IEEE 1394 (Firewire); hospital network communication protocols; and proprietary data communication protocols.

The at least one API 212 supports communication and interactions between software applications and logical components that are associated with operation of the device 200. For example, one or more APIs 212 may be configured to facilitate compatible communication and cooperation with the patient care application 110, and to facilitate receipt and processing of data from sources external to the device 200 (e.g., databases or remote devices and systems).

The display element 214 is suitably configured to enable the device 200 to render and display various screens, recommendation messages, alerts, alarms, notifications, GUIs, GUI control elements, drop down menus, auto-fill fields, text entry fields, message fields, or the like. Of course, the display element 214 may also be utilized for the display of other information during the operation of the device 200, as is well understood. Notably, the specific configuration, operating characteristics, size, resolution, and functionality of the display element 214 can vary depending upon the implementation of the device 200.

Figure 7:
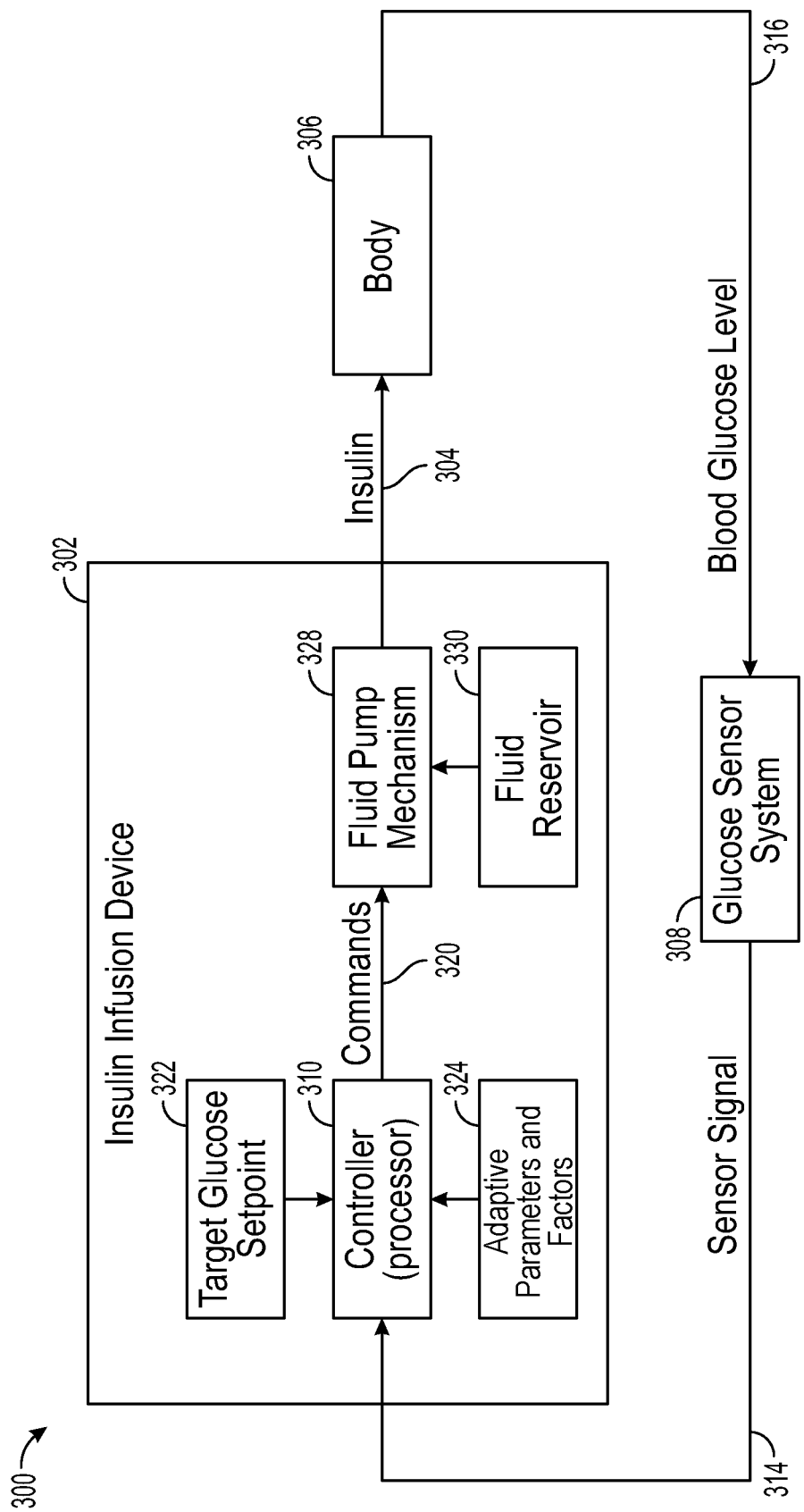
FIG. 7 is a block diagram representation of a closed loop glucose control system arranged in accordance with certain embodiments.

As mentioned above, the medication delivery system 102 is suitably configured and programmed to support an automatic mode to automatically control delivery of insulin to the user. In this regard, FIG. 7 is a simplified block diagram representation of a closed loop glucose control system 300 arranged in accordance with certain embodiments. The system 300 depicted in FIG. 7 functions to regulate the rate of fluid infusion into a body of a user based on feedback from an analyte concentration measurement taken from the body. In particular embodiments, the system 300 is implemented as an automated control system for regulating the rate of insulin infusion into the body of a user based on a glucose concentration measurement taken from the body. The system 300 is designed to model the physiological response of the user to control an insulin infusion device 302 in an appropriate manner to release insulin 304 into the body 306 of the user in a similar concentration profile as would be created by fully functioning human β-cells when responding to changes in blood glucose concentrations in the body. Thus, the system 300 simulates the body's natural insulin response to blood glucose levels and not only makes efficient use of insulin, but also accounts for other bodily functions as well since insulin has both metabolic and mitogenic effects.

Certain embodiments of the system 300 include, without limitation: the insulin infusion device 302; a glucose sensor system 308 (e.g., the analyte sensor 114 shown in FIG. 1); and at least one controller 310, which may be incorporated in the insulin infusion device 302 as shown in FIG. 7. The glucose sensor system 308 generates a sensor signal 314 representative of blood glucose levels 316 in the body 306, and provides the sensor signal 314 to the at least one controller 310. The at least one controller 310 receives the sensor signal 314 and generates commands 320 that regulate the timing and dosage of insulin 304 delivered by the insulin infusion device 302. The commands 320 are generated in response to various factors, variables, settings, and control algorithms utilized by the insulin infusion device 302. For example, the commands 320 (and, therefore, the delivery of insulin 304) can be influenced by a target glucose setpoint value 322 that is maintained and regulated by the insulin infusion device 302. Moreover, the commands 320 (and, therefore, the delivery of insulin 304) can be influenced by any number of adaptive parameters and factors 324. The adaptive parameters and factors 324 may be associated with or used by: a therapy control algorithm of the insulin infusion device 302; a digital twin model of the patient, which can be used to recommend manual insulin dosages; a meal prediction algorithm; a user glucose prediction algorithm; or the like.

Generally, the glucose sensor system 308 includes a continuous glucose sensor, sensor electrical components to provide power to the sensor and generate the sensor signal 314, a sensor communication system to carry the sensor signal 314 to the at least one controller 310, and a sensor system housing for the electrical components and the sensor communication system. As mentioned above with reference to FIG. 6, the glucose sensor system 308 may be implemented as a computer-based or processor-based component having the described configuration and features.

Typically, the at least one controller 310 includes controller electrical components and software to generate commands for the insulin infusion device 302 based on the sensor signal 314, the target glucose setpoint value 322, the adaptive parameters and factors 324, and other user-specific parameters, settings, and factors. The at least one controller 310 may include a controller communication system to receive the sensor signal 314 and issue the commands 320.

Generally, the insulin infusion device 302 includes a fluid pump mechanism 328, a fluid reservoir 330 for the medication (e.g., insulin), and an infusion tube to infuse the insulin 304 into the body 306. In certain embodiments, the insulin infusion device 302 includes an infusion communication system to handle the commands 320 from the at least one controller 310, electrical components and programmed logic to activate the fluid pump mechanism 328 motor according to the commands 320, and a housing to hold the components of the insulin infusion device 302. Accordingly, the fluid pump mechanism 328 receives the commands 320 and delivers the insulin 304 from the fluid reservoir 330 to the body 306 in accordance with the commands 320. It should be appreciated that an embodiment of the insulin infusion device 302 can include additional elements, components, and features that may provide conventional functionality that need not be described herein. Moreover, an embodiment of the insulin infusion device 302 can include alternative elements, components, and features if so desired, as long as the intended and described functionality remains in place. In this regard, as mentioned above with reference to FIG. 6, the insulin infusion device 302 may be implemented as a computer-based or processor-based components having the described configuration and features, including the display element 214 or other device-specific items 206 as described above.

The at least one controller 310 is configured and programmed to regulate the operation of the fluid pump mechanism 328 and other functions of the insulin infusion device 302. The at least one controller 310 controls the fluid pump mechanism 328 to deliver the fluid medication (e.g., insulin) from the fluid reservoir 330 to the body 306. As mentioned above, the at least one controller 310 can be housed in the infusion device housing, wherein the infusion communication system is an electrical trace or a wire that carries the commands 320 from the at least one controller 310 to the fluid pump mechanism 328. In alternative embodiments, the at least one controller 310 can be housed in the sensor system housing, wherein the sensor communication system is an electrical trace or a wire that carries the sensor signal 314 from the sensor electrical components to the at least one controller 310. In accordance with some embodiments, the at least one controller 310 has its own housing or is included in a supplemental or ancillary device. In other embodiments, the at least one controller 310, the insulin infusion device 302, and the glucose sensor system 308 are all located within one common housing.

Referring again to FIG. 1 and FIG. 7, certain functions, features, and/or therapy related operations of the medication delivery system 102 (e.g., the insulin infusion device 302) can be adjusted or modified in response to the output of the activity detection system 104 and/or the output of at least one ancillary system 106. For example, operation of the insulin infusion device 302 can be controlled or regulated in an appropriate manner based on a determination that the user has started, is currently participating in, or has completed a detectable and system-characterized type of exercise or activity. For example, if the system 100 determines that the user recently completed an hour long bike ride, then certain therapy-related settings can be adjusted. As another example, if the system 100 detects that the user has started a routine daily run along a common route, then a therapy control algorithm of the insulin infusion device 302 can be adjusted or replaced with an activity-correlated therapy control algorithm that compensates for an anticipated drop in the user's glucose level.

In accordance with certain embodiments, the system 100 recommends different types of physical activity or exercise as an alternative to medication therapy. The example described here assumes that the medication delivery system 102 delivers insulin to a diabetic patient. For such an implementation of the system 100, different types of characterized or defined physical activity are correlated with changes in glucose levels (or changes in any physiological characteristic of interest). Physical activity and exercise typically results in a reduction in blood glucose levels. Accordingly, if a diabetic user is experiencing a higher than normal glucose level, the system 100 can generate a recommendation (in the form of a notification, message, alert, or the like) that identifies: (1) an amount of insulin needed to correct the high glucose level; and (2) a specific activity or exercise that can be performed by the user as an alternative to the insulin dose. For example, the system 100 may generate a recommendation message that reads "Your glucose is 15 mg/dL above your target level. Walk for 30 minutes or take 1.5 Units of insulin to correct your glucose." As another example, the system 100 may generate a recommendation notification that reads "Your glucose is 10 mg/dL above your target level. Take 1.0 Unit of insulin, ride a bike at a moderate speed for 20 minutes, or do 100 jumping jack movements to correct your glucose." As yet another example, the system 100 may generate a recommendation notification during physical activity that reads "Your glucose is still 5 mg/dL above your target level. Take 1.0 Unit of insulin or continue walking at your current pace for another 20 minutes to correct your glucose."

In this way, the system 100 can leverage technology such as smart watches, fitness trackers, and gesture detection systems, which allow people to monitor and track their activity levels throughout the day. The duration and intensity of an activity can also be tracked using, for example, heartrate monitors, pedometer data, blood pressure monitors, and the like. As mentioned above, the blood glucose levels of diabetics can be affected in different ways by different types of physical activity. For people who wear a smart watch with activity tracking and a continuous glucose monitor, the specific effect of different types of exercise on blood glucose can be easily tracked and characterized by the system 100. Over time, machine learning and/or artificial intelligence algorithms and techniques can correlate a specific user's glucose response to activity levels, and can produce unique user-specific recommendations to achieve a particular glucose target by way of personalized exercise recommendations. Similarly, the system 100 can leverage general trends and population-based data to provide more generalized recommendations that need not be user-customized or based solely on a given user's activity data and glucose information. For example, generalized recommendations can be generated based on one or more user categories or descriptors such as, without limitation: age; gender; race or nationality; height; weight; body mass index; diet; health or disease history; lifestyle habits (smoking, drinking, sleeping patterns). Accordingly, the system 100 can provide safe and healthy exercise alternatives to taking medication (such as insulin) to achieve a desired physiological outcome.

The activity correlation database(s) 118 are initialized, populated, and maintained with entries corresponding to event-correlated physiological responses, which may be individual user-specific or generalized responses that are based on information collected for a plurality of different users. In accordance with certain embodiments, each entry includes a defined or characterized physical activity event and a corresponding change in a physiological characteristic of interest (e.g., blood glucose), wherein the change in the physiological characteristic historically results from the associated physical activity event. Moreover, each entry may include information that further defines, classifies, categorizes, or identifies the physical activity event, the manner in which the event impacts the physiological characteristic, and/or context associated with certain environmental conditions, user status, or other factors that might be linked to the physical activity event.

The output of the activity detection system 104 and/or the ancillary system(s) 106 is processed to identify and characterize the physical activities and exercise performed by the user. Sensor data from the analyte sensor 114 is processed to determine the manner in which the identified activities impact the monitored physiological characteristic. In certain embodiments, a suitable machine learning algorithm process historical activity-identifying data and corresponding analyte sensor data to establish correlations between characterized activity events and changes to the physiological characteristic of interest. The activity correlation database(s) can be maintained and updated in an ongoing manner to contemplate new users, to update personalized entries for existing users, to consider different or altered activity events, and to dynamically respond to changes in user lifestyle, health, medication therapy regimen, medication therapy outcome, and the like.

Figure 8:
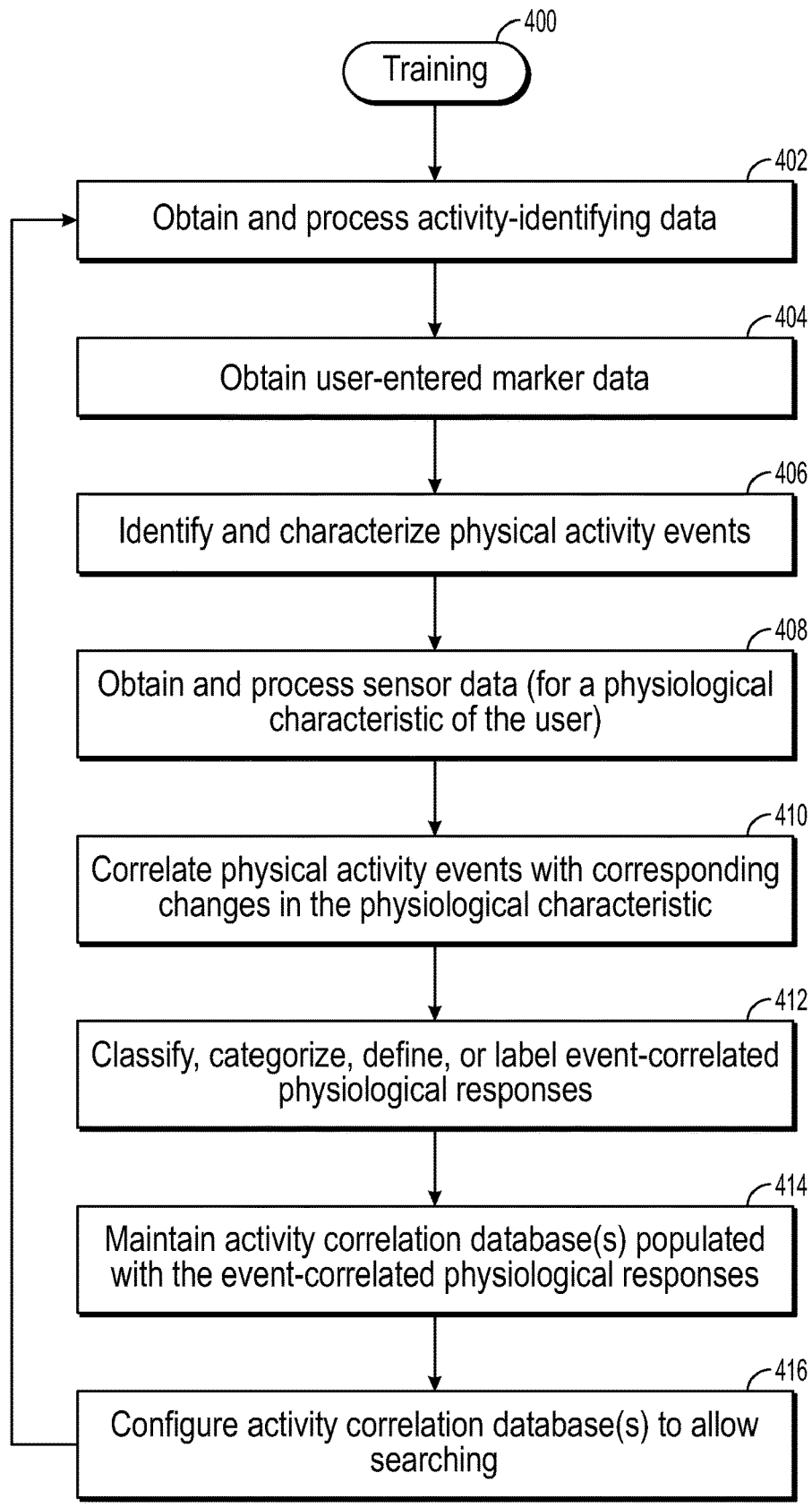
FIG. 8 is a flow chart that illustrates a training process according to certain embodiments.

FIG. 8 is a flow chart that illustrates a training process 400 according to certain embodiments. As mentioned above, the system 100 can be initialized or trained with historical activity data and historical analyte sensor data to establish correlations between different physical activities and resulting changes to a physiological characteristic. Accordingly, the process 400 can be employed with certain embodiments to define or characterize the different types of exercise or physical activities, to populate the activity correlation database(s) 118, and to update the activity correlation database(s) 118 in an ongoing manner. It should be appreciated that other methodologies, including those that need not employ "training" per se, can be utilized in an implementation of the system 100.

The process 400 obtains and processes activity-identifying data associated with one or more users (task 402), which may be provided by the activity detection system 104 and/or at least one ancillary system 106 during one or more training sessions or periods of time. More specifically, the activity-identifying data is produced and provided during physical activity of user(s). The activity-identifying data may include, be derived from, or be generated at least in part from any or all of the following, without limitation: gesture data provided by a gesture-based physical behavior detection system; user status data generated by one or more of the ancillary systems 106; motion, movement, velocity, acceleration, or any output data provided by a motion-based physical behavior detection system; output data provided by a fitness tracker system.

The process 400 may also obtain activity or behavior marker data, which may be entered by the user, during the training sessions or periods of time (task 404). The marker data can be obtained in response to the user interacting with one or more user devices 108 to record, flag, mark, declare, or otherwise identify points in time or periods of time during which the user is engaging in a particular activity, exercise, workout, or physical behavior. The activity marker data may also include information that characterizes or describes the type of activity or exercise, the duration of activity or exercise, the intensity of the activity or exercise, the surrounding context or conditions during which the activity was performed, and/or other metadata related to the recorded activities. For example, the user can indicate points in time or periods of time corresponding to activities such as: biking; swimming; rowing; running; walking; lifting weights; stretching; hiking; rock climbing; playing tennis; etc.

The received activity-identifying data (along with any corresponding user-entered marker data) can be processed by one or more components or applications of the system 100 to identify and characterize different physical activity events (task 406). As mentioned above with reference to FIG. 1, "raw" activity-identifying data can be processed and analyzed by the exercise application 112, the patient care application 110, one or more data processing systems 120, or the like. A physical activity event can be characterized in a simple and basic manner, in a complex and detailed manner, or anywhere along a spectrum ranging from simple to complex. For example, a simple characterization of a walking event may be "walk for 30 minutes" and a detailed characterization of a walking event may be "walk the Dirty Ditch path in the evening, at a moderate pace"—the system 100 can characterize physical activity events in any suitable manner that is appropriate for the particular embodiment.

The process 400 also obtains and processes sensor data that indicates at least one physiological characteristic of the user (task 408). The sensor data is provided by the analyte sensor 114, e.g., a continuous glucose monitor or a blood glucose meter that generates sensor data to indicate a glucose level of the user. The sensor data can be date/time stamped to facilitate synchronization or temporal correlation with the activity-identifying data. In this regard, the sensor data can be obtained contemporaneously with the activity-identifying data. The sensor data can be obtained in an ongoing manner after completion of the physical activity event, such that the system 100 can observe changes to the physiological characteristic that might be caused by the physical activity event. For example, the process 400 may consider sensor data for a designated period of time following completion of an event, such as one hour, four hours, or a day.

The process 400 continues by processing at least some of the obtained sensor data and at least some of the obtained activity-identifying data to correlate the physical activity events with corresponding changes in the physiological characteristic, as indicated by the obtained sensor data (task 410). This processing results in a number of event-correlated physiological responses for the user. The event-correlated physiological responses are derived from output data provided by the sources mentioned above, e.g., the activity detection system 104, one or more ancillary systems 106, a fitness tracker system, a gesture-based physical behavior detection system, or the like. The event-correlated physiological responses can be classified, categorized, defined, or labeled in an appropriate manner (task 412) to create searchable look-up table entries, a list, or any suitably formatted database objects. To this end, the process 400 maintains and populates at least one activity correlation database 118 for the event-correlated physiological responses (task 414). As mentioned above, the activity correlation database(s) 118 can be populated with individual user-specific records obtained for a plurality of contributing users, and/or with population-based records generated from data collected for a group or class of users.

The activity correlation database(s) 118 are configured, maintained, and operated to allow searching (task 416). More specifically, if a change in the physiological characteristic is known (e.g., blood glucose decreases by 15 mg/dL), a database 118 can be searched to find one or more activities or exercises that, if completed, should cause the physiological characteristic to change by the known amount. Conversely, if a specific form of exercise or a defined activity is planned or has already taken place, then a database 118 can be searched to find the expected change to the user's physiological characteristic. The searchable nature of the database(s) 118 allows the system 100 to take appropriate activity-related actions as needed.

Figure 9:
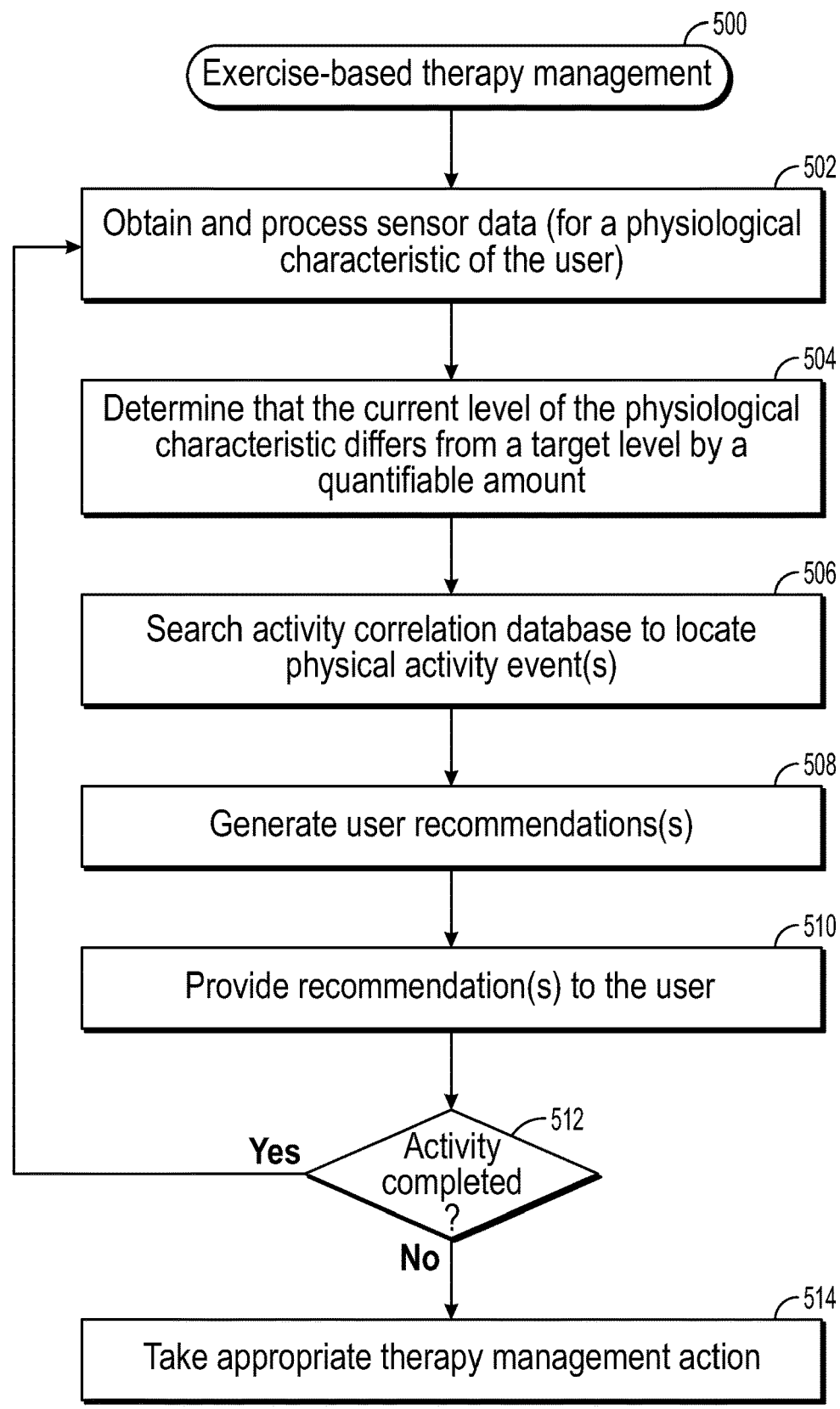
FIG. 9 is a flow chart that illustrates an exercise-based therapy management process according to certain embodiments.

FIG. 9 is a flow chart that illustrates an exercise-based therapy management process 500 according to certain embodiments. The following description of the process 500 assumes that at least an initial training of the system 100 (as described above with reference to FIG. 8) has been performed, and that at least one activity correlation database 118 has been populated and configured in an appropriate manner to support the described functionality. The process 500 obtains and processes sensor data that indicates a physiological characteristic of the user, such as glucose level (task 502). This example assumes that the medication delivery system 102 includes an insulin infusion device, and that the analyte sensor 114 is a glucose sensor, such as a continuous glucose monitor that communicates with the insulin infusion device. The sensor data can be used to control or regulate certain therapy-related functions or features of the insulin infusion device, such that the insulin infusion device responds to ongoing changes in the user's glucose level.

The obtained sensor data indicates the current (or most recently sampled) level of the physiological characteristic. The process 500 compare the current level against user-specific criteria to determine whether medication therapy is required or should be recommended. For example, the process 500 may compare the current level to a user-specific target level, such as a blood glucose target. This example assumes that the process 500 determines that the current level (as indicated by the sensor data) differs from the user-specific target level by a quantifiable amount, e.g., the current level is above the user-specific target level (task 504). In the context of an insulin delivery system, the quantifiable amount can be expressed as a glucose level expressed in units of mg/dL.

The process 500 continues by searching at least one activity correlation database 118 to locate matching event-correlated physiological responses that correlate the quantifiable amount with particular physical activity events (task 506). The searching may find one or more entries or records that include the quantifiable amount (i.e., the difference value that indicates a correction in the user's physiological characteristic) and, therefore, one or more correlated activity events, exercise events, etc. Accordingly, the search results may include any number of activity/exercise events that "match" the desired correction in the user's physiological characteristic. In certain embodiments, the searching considers additional contextual information, metadata, or ancillary data (e.g., from an ancillary system 106) to facilitate searching in a context-aware manner to find at least one physical activity even that is contextually appropriate for current conditions, user state, etc. For example, if the system detects that the user is on vacation or is in an unfamiliar location, then a context-aware search can omit any activity/exercise event that requires presence at a specific location. As another example, if the system detects poor weather conditions, then a context-aware search can omit any outdoor activity/exercise event. As another example, if the system determines that the user is at the office during a normal workday, then a context-aware search can focus on activity/exercise events that are less than an hour in duration and do not require any commuting.

This description assumes that the searching at task 506 finds at least one record that is appropriate for the detected difference in the user's physiological characteristic. In this regard, a record may indicate specific values of the physiological characteristic, or it may indicate a range of values or criteria that must be satisfied during searching. The process 500 generates at least one recommendation for the user (task 508), wherein the recommendations specify the physical activity or exercise event(s) associated with the matching records. The recommendation(s) are provided to the user in an appropriate format, using any suitable mechanism (task 510). In some examples, the recommendation(s) include one or more physical activity types and a particular intensity and/or duration for each of the one or more physical activity types. In some examples, the recommendation(s) also include a recommended dosage of a medication to be administered. In certain embodiments, the process 500 communicates the recommendation to a user device 108 in the form of a message, notification, or alert. A single recommendation may identify or specify any number of activity or exercise events that can be performed to correct the user's physiological characteristic. For example, a recommendation message may identify or specify: the amount to be corrected (e.g., 15 mg/dL); a recommended dosage of medication to be administered for correction (e.g., 1.5 Units of insulin); and one or more activity or exercise events that can be performed in lieu of taking the medication. The recommended dosage of medication is calculated to adjust the physiological characteristic of the user toward the user-specific target level. Thus, the recommended dosage of medication and the recommended activity or exercise events represent equivalent therapy approaches that are intended to achieve the same physiological outcome.

In certain embodiments, the activity detection system 104 and/or the ancillary system(s) 106 can be leveraged to check whether the user carries out a recommended activity or exercise (query task 512). The activity identifying data provided by the activity detection system 104 and/or the user status data provided by the ancillary system(s) 106 can be analyzed to determine whether the user completes a physical activity event specified in a recommendation. Alternatively or additionally, the process 500 can determine if the user begins a recommended physical activity. Alternatively or additionally, the process 500 can determine if the user is currently engaged in a recommended physical activity or any other physical activity. If the process 500 determines that the user has completed the recommended activity event (the "Yes" branch of query task 512), then the process 500 may exit or return to task 502 to continue as described above. If, however, the recommended activity event has not been performed (the "No" branch of query task 512), then the process 500 takes appropriate therapy management action (task 514). Any number of actions, operations, or adjustments can be initiated at task 514, depending on the particular embodiment, the current physiological state of the user, and other factors. For example, task 514 may initiate or control any of the following, without limitation: generate an alert or a reminder for the user; automatically administer a dosage of medication (e.g., up to the dosage conveyed in the previous recommendation); adjust a basal rate of medication delivered by the medication delivery system; generate and provide an alternative recommendation that includes a different type of physical activity or exercise; change one or more settings, time constants, thresholds or limits, or variables of a medication delivery control algorithm. In some examples, task 514 may determine that the user is performing but has not completed the recommended physical activity, and the process 500 may return task 502 (not shown in FIG. 9).

In some embodiments, the system 100 can leverage the content of the activity correlation database(s) 118 to provide user recommendations in response to the output of the activity detection system 104 and/or in response to user-indicated or user-declared physical activity or exercise events. Assume, for example, that the system 100 detects that the user has been walking for an hour, or that the user announces that they plan to walk for an hour. With this information, the system 100 can search the activity correlation database(s) 118 to obtain a physiological response of the user that normally results from an hour long walk. If the user's glucose level usually drops by 15 mg/dL after walking for an hour, then the system 100 can generate and communicate an appropriate reminder or recommendation for the user, such as: "Your glucose usually drops below your target level when you walk for an hour; you should eat a snack or drink a beverage with high carbohydrates." As another example, a recommendation based on a detected activity or exercise may read: "Your routine bike ride across town usually results in a 20 mg/dL drop in glucose level; you should consume X grams of carbohydrates before or during the ride." These examples merely illustrate this type of recommendation. The system 100 can generate and communicate any number of different recommendations as appropriate for the particular application and implementation, and as appropriate for the specific conditions and user status.

The various tasks performed in connection with a process disclosed herein may be performed by software, hardware, firmware, or any combination thereof. It should be appreciated that an embodiment of an illustrated process may include any number of additional or alternative tasks, the tasks shown in the figures need not be performed in the illustrated order, and a disclosed process may be incorporated into a more comprehensive procedure or process having additional functionality not described in detail herein. Moreover, one or more of the tasks shown in a figure could be omitted from an embodiment of the depicted process as long as the intended overall functionality remains intact.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method comprising:
obtaining sensor data that indicates a glucose level of a user, the sensor data provided by a glucose sensor;
determining that a current glucose level of the user differs from a user-specific target level by a quantifiable amount;
searching an activity correlation database to locate one or more physical exercise activity events correlated with the quantifiable amount of the glucose level, the activity correlation database populated with event-correlated physiological responses that associate physical exercise activity events with corresponding changes in the glucose level;
providing a recommendation for the user, the recommendation specifying the one or more physical exercise activity events;
receiving activity-identifying data associated with physical exercise activity of the user, the activity-identifying data provided by an activity detection system;
determining, based on the activity-identifying data associated with physical exercise activity of the user, that the user has not started to perform the specified one or more physical exercise activity events in the recommendation; and
automatically initiating, in response to determining that the user has not started to perform the one or more physical exercise activity events specified in the recommendation, at least one of:
administering a dosage of insulin to the user;
delivering insulin to the user at an adjusted basal rate; or
delivering insulin to the user using an insulin delivery system having one or more settings changed based on a difference between the current glucose level of the user and the user-specific target level.

2. The method of claim 1, further comprising:
processing the activity-identifying data to identify and characterize a plurality of physical activity events;
processing the obtained sensor data and at least some of the activity-identifying data to correlate the plurality of physical activity events with the corresponding changes in the glucose level as indicated by the obtained sensor data, to obtain the event-correlated physiological responses for the user; and
populating the activity correlation database with the event-correlated physiological responses.

3. The method of claim 1, wherein:
the recommendation includes a recommended dosage of insulin to be administered as an alternative to the one or more physical exercise activity events; and
the recommended dosage of insulin is calculated to adjust the glucose level of the user toward the user-specific target level.

4. The method of claim 1, wherein:
the activity detection system comprises a motion-based physical behavior detection system; and
the activity-identifying data is generated at least in part from output data provided by the motion-based physical behavior detection system.

5. The method of claim 1, wherein:
the activity detection system comprises at least one ancillary system that monitors the user; and
the activity-identifying data comprises user status data generated by the at least one ancillary system.

6. The method of claim 1, wherein the activity correlation database is populated with event-correlated physiological responses for a plurality of contributing users.

7. The method of claim 1, further comprising:
obtaining, from at least one ancillary system that monitors the user, contextual information associated with the user; and
selecting, from the one or more physical exercise activity events and based on the contextual information associated with the user, a physical exercise activity event that is contextually appropriate for a current condition of the user,
wherein the recommendation specifies the selected physical exercise activity event that is contextually appropriate for the current condition of the user.

8. The method of claim 1, further comprising:
detecting, based on the activity-identifying data, a physical activity event of the user;
searching the activity correlation database using the detected physical activity event to determine an expected change of the glucose level due to the physical activity event; and
estimating the current glucose level of the user based on the sensor data and the expected change of the glucose level.

9. The method of claim 1, further comprising, in response to determining that the user has not started to perform the one or more physical exercise activity events and before the initiating:
generating an alert or a reminder for the user; or
recommending one or more alternative physical exercise activity events to the user.

10. The method of claim 1, wherein the activity correlation database is populated with event-correlated physiological responses for the user.

11. A system comprising:
at least one non-transitory computer readable medium comprising program code instructions; and
at least one processor, wherein the program code instructions are configurable to cause the at least one processor to perform operations comprising:
obtaining sensor data that indicates a glucose level of a user, the sensor data provided by a glucose sensor;
determining that a current glucose level of the user differs from a user-specific target level by a quantifiable amount;
searching an activity correlation database to locate one or more physical exercise activity events correlated with the quantifiable amount of the glucose level, the activity correlation database populated with event-correlated physiological responses that associate physical exercise activity events with corresponding changes in the glucose level;
providing a recommendation for the user, the recommendation specifying the one or more physical exercise activity events;
receiving activity-identifying data associated with physical exercise activity of the user, the activity-identifying data provided by an activity detection system;
determining, based on the activity-identifying data associated with physical exercise activity of the user, that the user has not started to perform the specified one or more physical exercise activity events in the recommendation; and automatically initiating, in response to determining that the user has not started to perform the one or more physical exercise activity events specified in the recommendation, at least one of:

administering a dosage of insulin to the user;

delivering insulin to the user at an adjusted basal rate; or delivering insulin to the user using an insulin delivery system having one or more settings changed based on a difference between the current glucose level of the user and the user-specific target level.

12. The system of claim 11, wherein:

the recommendation comprises a recommended dosage of insulin to be administered as an alternative to the one or more physical exercise activity events; and the recommended dosage of insulin is calculated to adjust the glucose level of the user toward the user-specific target level.

13. The system of claim 11, wherein the event-correlated physiological responses are derived from output data provided by a fitness tracker system.

14. The system of claim 11, wherein the event-correlated physiological responses are derived from user status data generated by at least one ancillary system.

15. The system of claim 11, wherein the operations performed by the at least one processor further comprise:

processing the activity-identifying data to identify and characterize a plurality of physical activity events; and processing the obtained sensor data and at least some of the activity-identifying data to correlate the plurality of physical activity events with the corresponding changes in the glucose level as indicated by the obtained sensor data, to obtain the event-correlated physiological responses for the user; and populating the activity correlation database with the event-correlated physiological responses.

16. The system of claim 11, wherein:

the activity detection system comprises a motion-based physical behavior detection system; and the activity-identifying data is generated at least in part from output data provided by the motion-based physical behavior detection system.

17. The system of claim 11, wherein the activity correlation database is populated with event-correlated physiological responses for a plurality of contributing users.

18. The system of claim 11, wherein the operations performed by the at least one processor further comprise:

obtaining, from at least one ancillary system that monitors the user, contextual information associated with the user; and selecting, from the one or more physical exercise activity events and based on the contextual information associated with the user, a physical exercise activity event that is contextually appropriate for a current condition of the user, wherein the recommendation specifies the selected physical exercise activity event that is contextually appropriate for the current condition of the user.

19. The system of claim 11, wherein the operations performed by the at least one processor further comprise:

detecting, based on the activity-identifying data, a physical activity event of the user;

searching the activity correlation database using the detected physical activity event to determine an expected change of the glucose level due to the physical activity event; and estimating the current glucose level of the user based on the sensor data and the expected change of the glucose level.

20. The system of claim 11, wherein the operations performed by the at least one processor further comprise, in response to determining that the user has not started to perform the one or more physical exercise activity events and before the initiating:

generating an alert or a reminder for the user; or recommending one or more alternative physical exercise activity events to the user.

* * * * *